US010120776B2

(12) United States Patent
Furtwangler et al.

(10) Patent No.: US 10,120,776 B2
(45) Date of Patent: Nov. 6, 2018

(54) DOCUMENTS FOR HUMAN READABLE DOCUMENTATION AND RUNTIME VALIDATION

(71) Applicant: Home Box Office, Inc., New York, NY (US)

(72) Inventors: Tyler R. Furtwangler, Sammamish, WA (US); Brandon C. Furtwangler, Issaquah, WA (US); Nathan J. E. Furtwangler, Kirkland, WA (US)

(73) Assignee: HOME BOX OFFICE, INC., New York, NY (US)

( * ) Notice: Subject to any disclaimer, the term of this patent is extended or adjusted under 35 U.S.C. 154(b) by 0 days.

(21) Appl. No.: 14/843,920

(22) Filed: Sep. 2, 2015

(65) Prior Publication Data
US 2016/0070637 A1   Mar. 10, 2016

Related U.S. Application Data

(60) Provisional application No. 62/046,104, filed on Sep. 4, 2014.

(51) Int. Cl.
| G06F 11/36 | (2006.01) |
| G06F 8/75 | (2018.01) |
| G06F 17/30 | (2006.01) |

(52) U.S. Cl.
CPC ............ *G06F 11/3612* (2013.01); *G06F 8/75* (2013.01); *G06F 11/3644* (2013.01); *G06F 17/30011* (2013.01)

(58) Field of Classification Search
None
See application file for complete search history.

(56) References Cited

U.S. PATENT DOCUMENTS 8,448,130 B1 *   5/2013   Pillarisetti .............. G06F 8/447
                                                        717/104
8,473,916 B2 *   6/2013   Venkatraman ...... G06F 11/3664
                                                        717/124

(Continued)

OTHER PUBLICATIONS

Irmak et al. "Interactive wrapper generation with minimal user effort." Proceedings of the 15th international conference on World Wide Web. ACM, 2006.Retrieved on [Jun. 19, 2018] Retrieved from the Internet: URL<https://dl.acm.org/citation.cfm?id=1135859>.*

(Continued)

*Primary Examiner* — Thuy Dao
*Assistant Examiner* — Cheneca Smith
(74) *Attorney, Agent, or Firm* — Amin, Turocy & Watson, LLP

(57) ABSTRACT

The described technology is directed towards having document files (e.g., a JSON object) associated with objects of a computer program. The document files may include validation information that is used during runtime to validate one or more parts of the object via validation code such as a validation function. For example, a function of an object may have one validation function that during runtime validates whether the input parameter(s) are valid (their types and/or values are correct), and another validation function that during runtime validates whether the return values from the function are valid. Also described is processing the document files into more easily readable documentation, e.g., without any source code.

20 Claims, 10 Drawing Sheets

(56) References Cited

U.S. PATENT DOCUMENTS

| | | | |
|---|---|---|---|
| 8,713,531 B1* | 4/2014 | Pettis | G06F 11/3688 717/100 |
| 8,826,240 B1* | 9/2014 | Lachwani | G06F 8/30 714/38.1 |
| 2004/0098707 A1 | 5/2004 | Tang et al. | |
| 2005/0091531 A1* | 4/2005 | Snover | G06F 9/45512 726/4 |
| 2006/0010258 A1* | 1/2006 | Zare | G06F 11/3604 710/1 |
| 2007/0234308 A1* | 10/2007 | Feigenbaum | G06F 9/451 717/130 |
| 2008/0168427 A1* | 7/2008 | Bestgen | G06F 11/3636 717/128 |
| 2008/0184204 A1* | 7/2008 | Tigani | G06F 11/3604 717/126 |
| 2009/0006897 A1 | 1/2009 | Sarsfield | |
| 2009/0217100 A1* | 8/2009 | Grechanik | G06F 11/368 714/38.1 |
| 2010/0333061 A1* | 12/2010 | Mohalik | G05B 19/0426 717/104 |
| 2011/0055815 A1* | 3/2011 | Squillace | G06F 11/3612 717/125 |
| 2011/0258603 A1* | 10/2011 | Wisnovsky | G06F 11/3612 717/125 |
| 2012/0192153 A1* | 7/2012 | Venkatraman | G06F 11/3672 717/124 |

OTHER PUBLICATIONS

Froihofer et al. "Overview and evaluation of constraint validation approaches in Java." Proceedings of the 29th international conference on Software Engineering. IEEE Computer Society, 2007. Retrieved on [Jun. 19, 2018] Retrieved from the Internet:URL<https://dl.acm.org/citation.cfm?id=1248864>.*

International Search Report and Written opinion from International Patent Application Serial No. PCT/US15/48387, dated Dec. 14, 2015, 13 pages.

* cited by examiner

DOCUMENTS FOR HUMAN READABLE DOCUMENTATION AND RUNTIME VALIDATION

CROSS-REFERENCE TO RELATED APPLICATION

The present application claims priority to U.S. provisional patent application Ser. No. 62/046,104, filed Sep. 4, 2014, the entirety of which is incorporated herein by reference.

COPYRIGHT DISCLAIMER

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Developing a computer program is often a very large and cumbersome task. For any relatively large project, there is a significant amount of coding that needs to be done, followed by testing and debugging. This typically leads to frequent changes, new enhancements and so forth, which may fix many errors but also may introduce new errors.

For example, consider a program written in JavaScript® or similar loosely-typed programming language. Programming languages that are loosely typed have variables that are declared without a type; the programming language determines the type for each declared variable and there is no internal type checking performed. Further, types are dynamic, e.g., a variable x may be set to a numerical value (var x=10, whereby variable x's type is a number) and later, possibly in the very next statement, the same variable x may be set to a string (var x="Tuesday", whereby variable x's type is now a string). These characteristics of JavaScript® can lead to a number of errors. For example, an existing function may expect a string as a parameter when invoked by a new calling function, but that new calling function may instead provide a number, causing a bug.

Code written in dynamic languages, such as JavaScript® code, can be harder to maintain and debug due to their dynamic runtime behavior. Function parameters, return values, and property accessors are typically not type-enforced resulting in a large amount of code that needs to handle any object type at any time. It is common for JavaScript® code to have a large amount of checks inside of a function to ensure that the parameters are of the correct type and/or shape. Additionally, the results of functions are typically checked before using them due to this same dynamic nature. To make these checks, robust JavaScript® code nearly always litters 'if' checks to validate the incoming and outgoing data. Without the checks, it is easy to misuse the code and do unexpected things (something may not fail right away, leading to issues further down the road). These checks clutter the code and negatively impact performance.

To debug such errors, a developer often refers to documentation. The most common approach in software development is to place the documentation (e.g., for functions/classes JavaScript® prototypes) within the source code as comments or the like. However, this makes the source code hard to follow, as proper documentation is verbose and typically requires more lines than the actual code. This mixture of source code and its documentation is also difficult for humans to read without extensive post-processing and tooling.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, the technology described herein is directed towards an object having an associated document file. The document file contains validation information indicating that a part of the object (e.g., a function, a property an event) is to be validated. Validation code corresponding to the validation information is executed during runtime to validate the part of the object.

Other advantages may become apparent from the following detailed description when taken in conjunction with the drawings.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
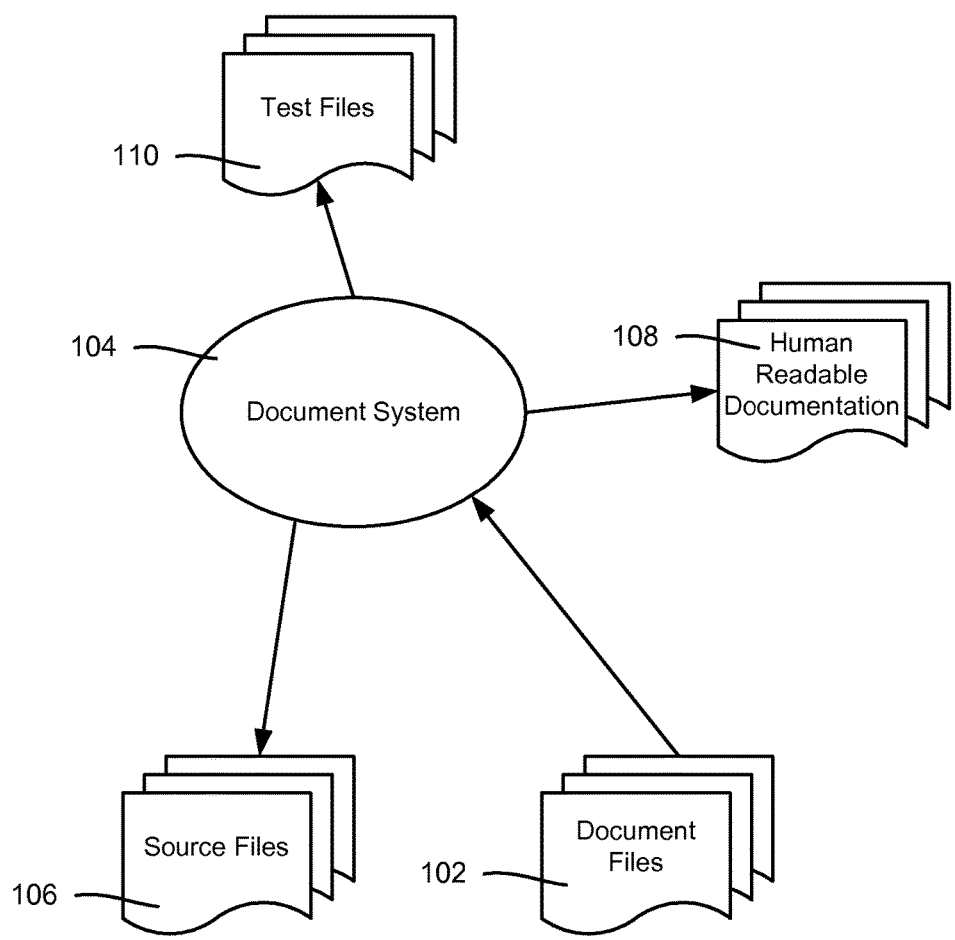
FIG. 1 is an example block diagram representation of a documentation system with which documents are registered to provide source code that can be validated during runtime and to provide human readable documents, according to one or more example implementations.

Various aspects of the technology described herein are generally directed towards having documents that are converted by a document system to source code (generally without any comments or at least minimal comments) and human readable documentation comprising files that are straightforward to read (that is, not including much if any source code). Each document (e.g., a JavaScript® Object Notation (JSON) object) describes an object and its interface(s). The documents may contain information on classes, function descriptions, parameter names and types, event names and types, property names and types, and so forth. The human readable files may be output as HTML documents, PDF documents, and/or in any suitable human readable format. In general, the JSON object technically is itself human readable to an extent, however it basically contains source code in a format that makes it difficult for humans to easily read the documentation; as described herein, "human readable" with respect to documents means the majority of the source code (if not all) is removed (or clearly separated from) the descriptive text comprising comments, a listing of the properties, events, methods and each of their related data or the like that is not in the source code format.

Runtime validation may be performed during runtime using one or more of the documents to ensure that a piece of code is adhering to the documented values (input parameter types and/or values, return value types and/or values, property types and/or values, events and/or event-related data and so forth). Runtime validation also may be done using the documents to ensure type correctness (an object has the correct methods, properties and so forth). Runtime validation uses the information in the documents to make these checks. Significantly, once a piece of code (e.g., an individual object, an area of a program, a function of an object and so on) is validated, there is no need to make the checks again, which is far more efficient than having the checks written into the code itself.

To this end, a document file is registered with a document system, and describes in detail the documentation for its corresponding source file. Note that for registration, JSON files may include soft-referenced links to existing code, or, in one more implementations, executable code that uses a JavaScript object (with executable functions) may register the document file. In one or more implementations, there is a one-to-one mapping of document files to source files. For example, the document file can register zero or more classes with the document system, each of which contain a description of the class, any properties, methods, events, or other framework-specific documentation information. Note that JavaScript® does not include the concept of classes, however conventional object-oriented concepts such as class hierarchies, interfaces, and static methods and properties may be mapped to the JavaScript® prototypal object system, as described herein.

As also described herein, the format of the document files may be a JSON object, and when registering with the document system, the data may comprise an object containing simple data types (strings for descriptions, Booleans for indicating optional parameters, and so forth). The object also may include more complex types like functions, including for runtime validation of a parameter type and/or value by executing the registered function on the parameter value in question.

The document system is able to produce human readable documentation directly from the registered document by loading a document file, and running an export functionality to produce the desired output. As described herein, the document system with its registered document files can produce the human readable documentation by iterating over the registered document objects and reading the data. Existing documentation solutions, typically used with documents inside of source code, can be used in conjunction with this system. YUIDoc, for example, uses a specific block comment notation for producing HTML documents that can be linked/cross referenced. The document system can produce files which conform to this block comment notation which are processed by YUIDoc. Other documentation solutions may likewise be used.

The conversion from the rich document file format to the human readable documentation need not always be one-to-one. That is, some concepts that are well-defined in the document files may not exist in the human readable documents. An example of this is Events, where the document files can describe events as a high level concept; however the human readable documentation may not specifically understand Events as a concept. In situations like this, the conversion process can map those concepts to applicable human readable concepts. For instance, an Event can be described as an object who has an 'on' and 'off' function.

The source files are able to use the document system, possibly in conjunction with a multifunctional wrapper pattern to automatically perform runtime validation against the registered documents for functions, property getter/setters, and so forth. When used, the multifunctional wrapper pattern allows for selectively turning runtime validation and/or tracing on or off for any subset of one or more objects, functions, properties, events and so forth.

With respect to runtime validation, the rich document descriptor format allows for complex runtime validation functions. These can be as simple as a statement or function that returns true if the provided value is a string, or a more complex function to validate some project-specific needs.

By way of example, in one platform/framework, a specific validation function is used to determine if an object is an instance of an 'OOP' type, in which the function checks to see if the object or its prototype chain has a specific property that contains its fully qualified class name in the OOP system. In general, "OOP" refers to a type system, (as described in copending U.S. provisional patent application Ser. No. 62/046,139 "Object-Oriented Programming Library"), which in general comprises an object-oriented programming library developed to make it easier to declare and implement objects and object hierarchies in JavaScript® or similar technology. Note that the term class hierarchy is not used because JavaScript® does not have classes; it has only object instances. JavaScript® supports inheritance through prototypes rather than classes. The OOP enables mapping conventional object-oriented concepts such as class hierarchies, interfaces, and static methods and properties onto the JavaScript® prototypal object system. This type system includes the concept of both interfaces and classes that implement them.

It is also possible to chain validation functions (and or statements) together to produce complex validations; (to validate whether a returned value is a string OR is it a number, for example). These validation functions and rich document descriptor formats allow the source files to do runtime checks against it. Note that, for example, an object A may inherit from another object B, e.g., its interfaces, and this inheritance relationship is maintained so that when validating object A via object A's corresponding registered document, any information needed with respect to object B may be obtained for validation via object B's corresponding registered document.

It should be understood that any of the examples herein are non-limiting. For instance, many of the examples refer to validating a function's (method's) input parameter(s) and output result(s) during validation. However, virtually any describable entity in the code may be validated, including but not limited to functions, property getters, property settings, property values, interfaces, events, input and output values, input and output value types, data shape (e.g., format) and so on. As such, the technology described herein is not limited to any particular embodiments, aspects, concepts, structures, functionalities or examples described herein. Rather, any of the embodiments, aspects, concepts, structures, functionalities or examples described herein are non-limiting, and the technology may be used various ways that provide benefits and advantages in computing and programming in general.

FIG. 1 is a generalized, conceptual diagram showing various example components that may be used to implement aspects of the technology described herein. In FIG. 1, document files 102 (e.g., JSON objects) each register with a document system 104. The document system 104 processes the document files 102 into source files 106 and human readable documentation 108. A tool such as YUIDoc (a well-known, publicly documented JavaScript® documentation tool) or other such tool may be used by the document system in generating the human readable documentation 108. A set of test files 110 also may be automatically generated by the document system or a tool coupled thereto, e.g., one for each registered type that tests the object while mocking out other objects, tests when given good input to methods and set property values as well as bad input, and so on.

Note that it is straightforward and well known to convert a JSON object to JavaScript® and thus this aspect is not described herein except to note that the source files generally have no comments or minimal comments. Further note that while comments within the source code are generally not desirable as described herein, it is feasible for a comment to be flagged so as to not be removed (e.g., a copyright notice at the start of each source file and/or something a developer wants to quickly point out regarding that piece of code such as its general purpose), and/or to edit a source file afterward being processed by the document system to include one or more comments.

In general, each type is registered up as a document (e.g., a JSON object) with the documentation system. The document describes one or more functions, including any details and descriptions, their parameters and their types, which parameters are optional and which are not, return values for methods and their types.

Moreover, the document also may include validation functions as described herein. Validation functions need not be limited to simple type checking (e.g., validate whether a parameter value is a string), but rather may be run to validate anything related to an object. This may be a custom function, e.g., whether a value is a string or a number, a number between x and y, whether the object is an object of the OOP type system (a validation function takes an object and walks up prototype chain to determine whether the object is an instance of the OOP system with a fully qualified name).

An object being registered also may reference other entities not yet in existence. If so, the registration system maintains information regarding these linked entities, so that the registration system may link them to the object when they do exist.

With respect to the documentation system, some (non-runtime) validation may be performed when a document (e.g., JSON object) registers with the system. For example, consider that the document indicates that it is an object that derives from a base class (in the OOP system) and implements an interface. It may also include property values, arrays, specify a singleton or collection, events and so on. A registration validation function or the like may be invoked at the time of registration to ensure that the object is properly defined, e.g., the named base class exists, and so on. Registration validation also may validate that the object properly implements the functions of the base class, that its error event's emitted argument is the correct type, and so on.

When registering a document file, the document file provides its fully qualified name, along with a breakdown of its methods, properties, events and so on, essentially to describe everything registered on that object. The documentation system walks through the document file to find (e.g., JSON object) its name, and may find something like a properties array with a start method and validation property, which is a function that checks an argument and returns true if the proper type, e.g., Boolean. The document system 104 records that on the fully qualified name, there is such a start method, and so on. This is done for all types that can register.

As described herein, validation may be performed by validation functions identified in a document file. For example, frequently used validation code such as for type checking each property value, input parameter and output return value is typically performed for any function or property, and thus a library of validation functions may be accessed for frequently used validation.

Note that instead of or in addition to functions, a document file may include statements implementing validation logic directly instead of doing so via a validation function. By way of example, consider a need to check a value for being within an allowed range (e.g., to validate that input parameter x is number between 0 and 100). This can be done with simple JavaScript® "if . . . else" statements in the document instead of a function call that executes the statements.

Moreover, via validation statements (or functions), complex validation checks may be used. For example, consider an object method that can input either a string or a number type, but not, for example, a Boolean type, null type, undefined type or symbol type. To validate the input value, a chain of checks may be configured in the document file (or in a function), basically asking whether the value type "is a string OR is a number" for example. For example, if foo(x)==True OR bar(x)==True return True else return False.

Further, in the document, a developer may specify a call to any custom validation function the developer wants run for validation, including a function that looks for certain information. For example, as described above, a function may be called during validation to determine if an object is an instance of an OOP type, that is, to see if the object or its prototype chain has a specific property that contains its fully qualified class name in the OOP system.

Figure 2:
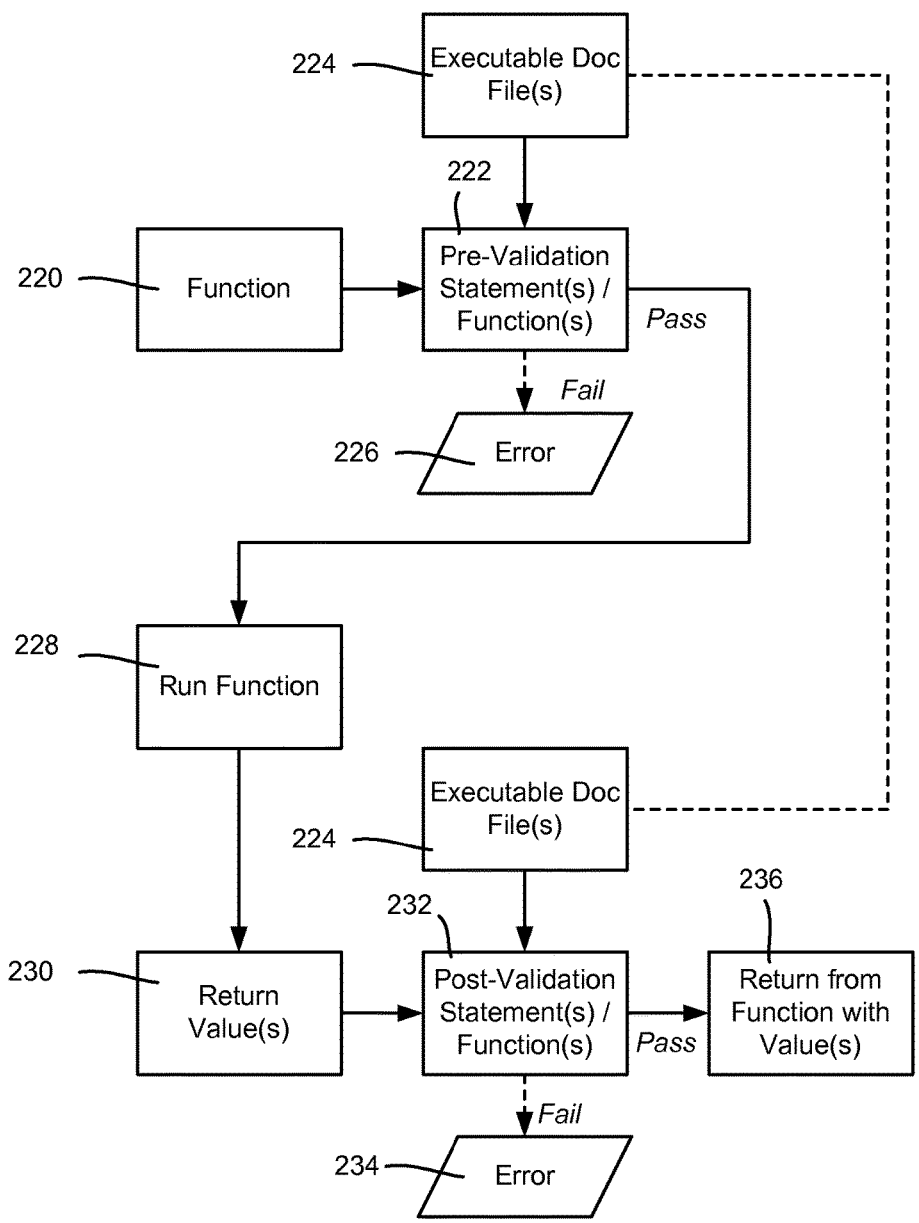
FIG. 2 is an example block diagram representation showing how part of an object e.g., a function) may be validated during runtime, according to one or more example implementations.

FIG. 2 shows the concept of runtime validation for a function 220 that takes in one or more input parameters and returns one or more return values. In general, the function 220 has validation turned on for it, e.g., via a wrapper that is added when the object containing the function is created. As a result, one or more pre-function validation statements and/or functions 222 (run before running the function) are executed based upon the document file(s) 224 for this function 220.

If the overall result (e.g., after any Boolean algebra among statements and/or multiple functions) is that the function 220 failed, an error 226 (e.g., exception, or possibly a set of errors/exceptions) results. The error may indicate what part of the validation operation detected failure, e.g., the input parameter x was not a string. Otherwise, the validation passes.

If the validation passes, the function is run, as represented via block 228. In this example, the function has one or more return values 230 that are validated by post-function validation statement(s) and/or function(s) 232 based upon the document file(s) 224. If validation fails, a different error 234 (or possibly a set of errors) may be output for a post-function validation failure that identifies what went wrong. Otherwise the function returns the value or values to the invoking entity (block 236) basically as if validation was never turned on.

Note that virtually any information may be checked including input parameter and return value types and/or the value of each parameter/return value (e.g., whether the value is within a range). Properties and events may likewise be validated; e.g., an event may trigger some function that needs to be validated as being the correct function (or failed if not correct). Another possible check is based upon some parameters or return values being required while others are optional; thus validation checks may be performed that evaluate whether all required parameters are received and/or all required return values are present when the function completes. The shape of input parameter data and/or returned data may be validated as well, e.g., whether such data is formatted appropriately.

It is feasible to validate something indirectly related to the function, e.g., something more than validating the input and output data. As an example, consider a function that evaluates memory space used by a function when run, and fails if some threshold amount of space is exceeded. As yet another example, pre-validation may be used to turn on a timer just before running the function, with the first part of post-validation turning the timer off, to validate that the function completes within a time threshold; (although tracing and logging, also possibly selectively turned on via a wrapper, may be used instead for such evaluation). Virtually any state/condition/data/operation that may be evaluated as a result of running code or after running code may be used to validate an object or internal part of an object such as a function, property or event.

Figure 3:
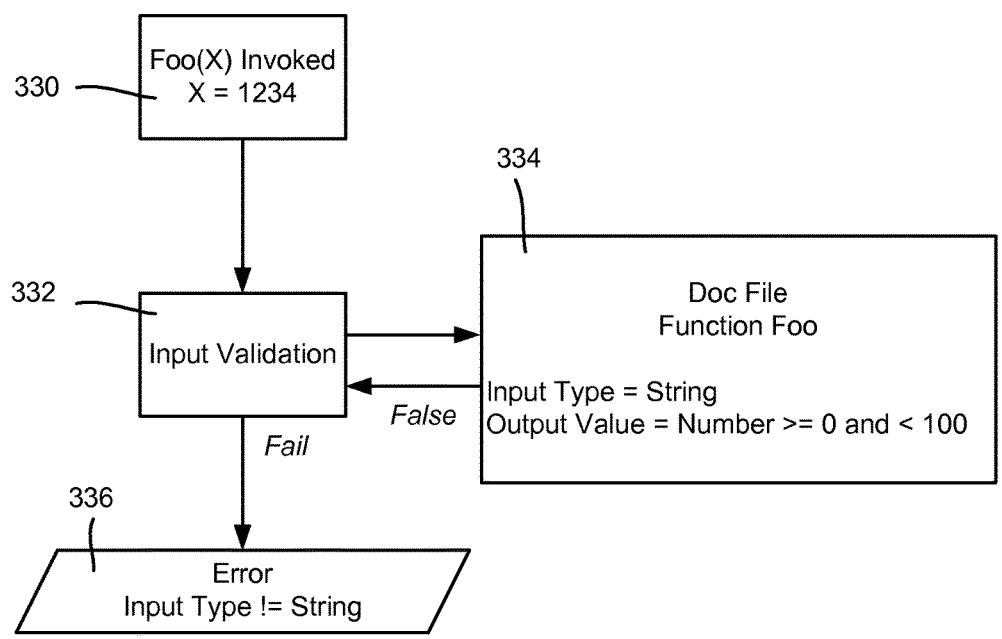
FIG. 3 is an example block diagram representation showing pre-validation with respect to a function's input parameter(s) during runtime before running the function, according to one or more example implementations.

FIG. 3 shows an example of pre-validation for a function foo(X) 330 that is invoked with x=1234 (a number). Input validation 332 (e.g., code wrapping the function 330) accesses the doc file 334, which indicates that the type of x needs to be a string. This may be a function such as checkIfString( ) invoked from the doc file or by the validation code that returns pass or fail (or true/false), or may be specified directly as statements, e.g., if the variable type is a string then pass, else fail. In this example, the validation fails, because x is a number not a string as needed. Output 336 from the validation associated with the error (e.g., a thrown exception) may specify the reason for the failure, x was not a string.

Figure 4:
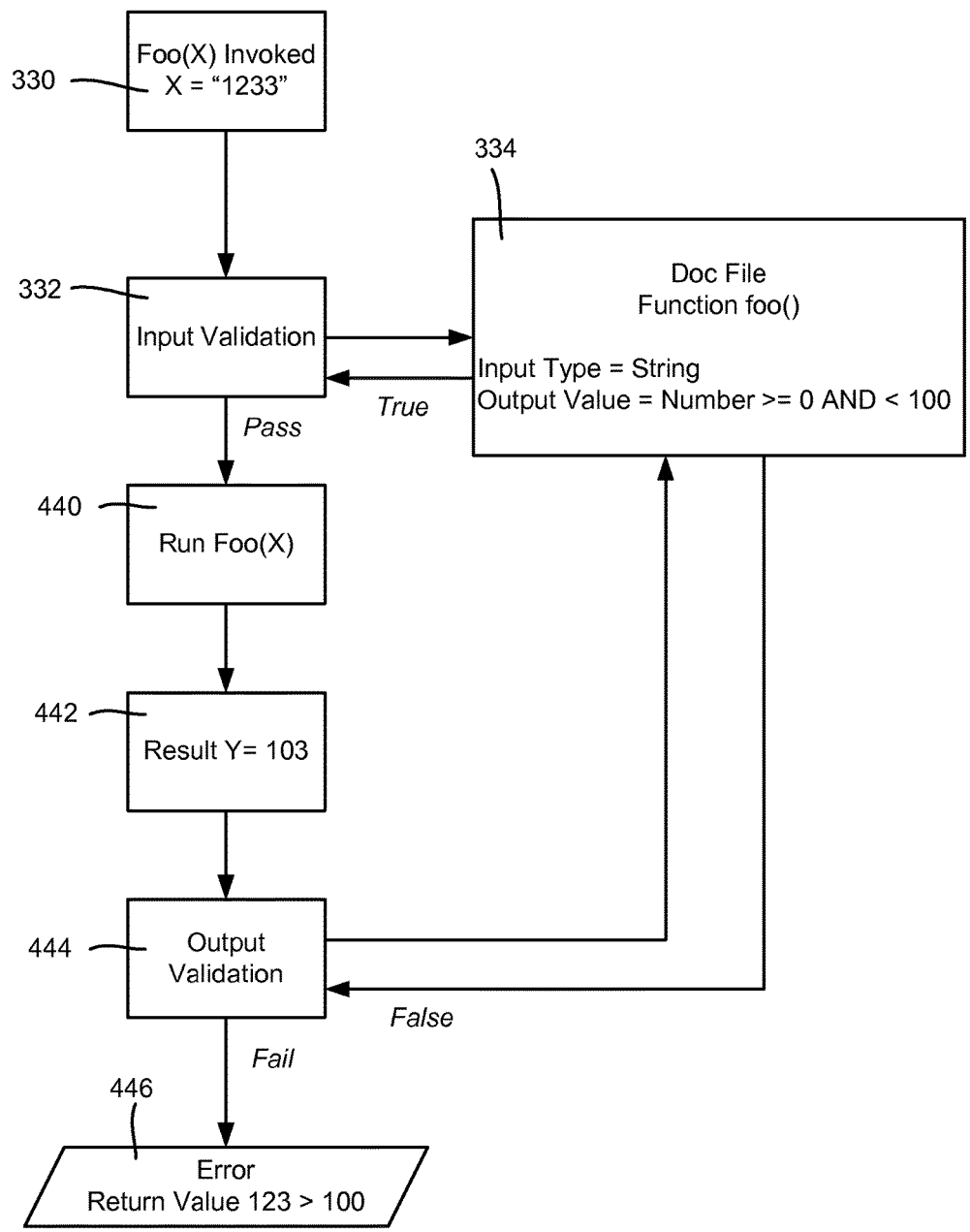
FIG. 4 is an example block diagram representation showing post-validation with respect to a function's return value(s) during runtime after running the function, according to one or more example implementations.

Consider that the bug causing this problem is removed from the invoking function, whereby in a later run, the function foo(X) 330 is invoked with x=1234 (a number). FIG. 4 shows an example of pre-validation and post-validation for the function foo(X) 330 when invoked with x="1234" (a string because of the quotes). As before, input validation 332 (e.g., code wrapping the function 330) accesses the doc file 334, which indicates that the type of x needs to be a string.

In the example of FIG. 4, the doc file returns Pass (or True), and thus validation is passed, whereby this time function foo( ) is run (block 440) with the value of "1234" for x. In this example, the function provides a value of Y=123 as its result 442. Output validation 444 is then performed on this result, which fails because Y's value needs to be a number between 0 and 100, and while Y is a number, its value is not within the specified range in this example. Thus, False (or Fail) is returned, whereby output validation throws an error 446, which may provide whatever information is known from the validation function or statement, e.g., the return value of 123 is greater than 100.

Figure 5:
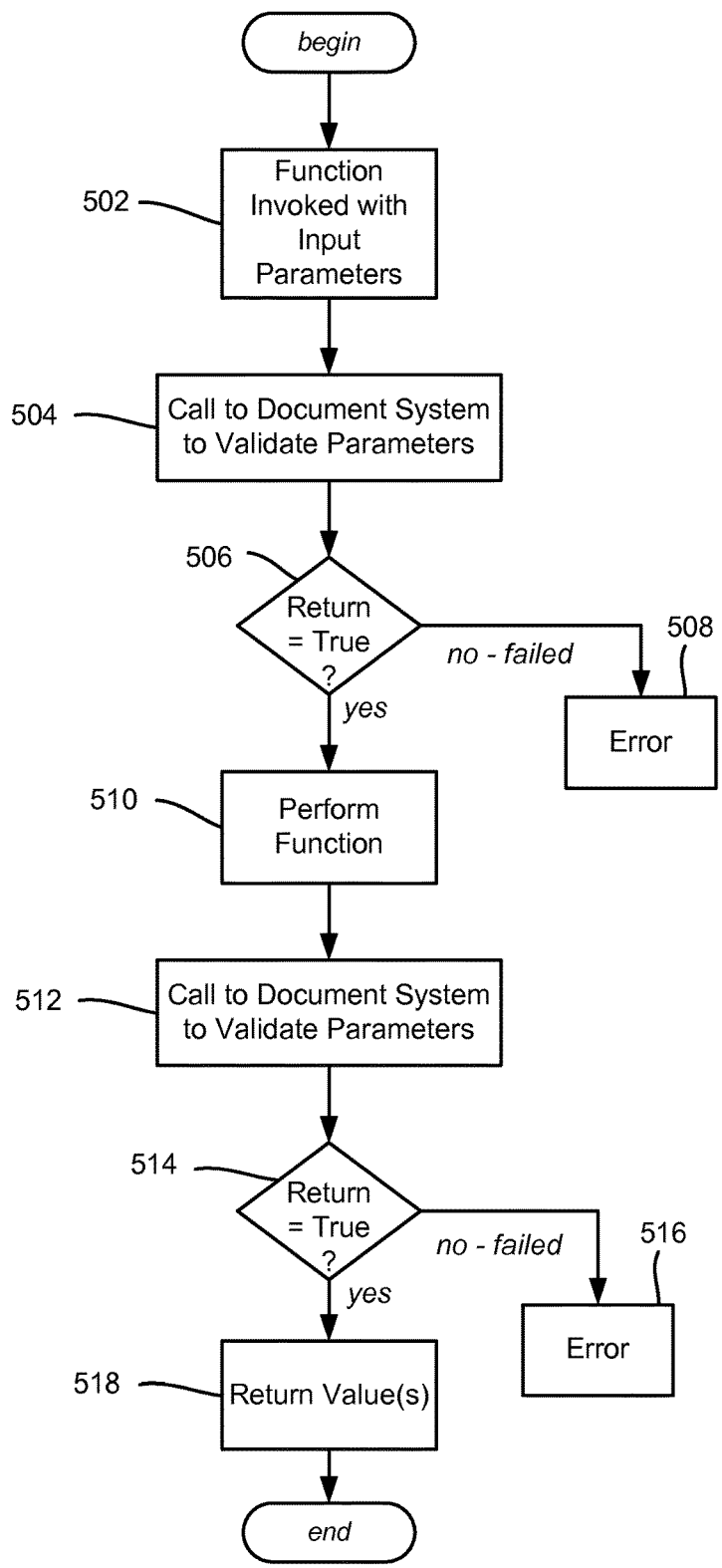
FIG. 5 is flow diagram showing example steps related to pre-validate a function's input parameter(s) and post-validate a function's return value(s), according to one or more example implementations.

FIG. 5 summarizes the validation logic in the example steps of a flow diagram, beginning a step 502 where a function is invoked. In one or more implementations, there is no determination needed as to whether validation is on or not for an entity (in this example a function), as validation is either performed or not performed for the function by its being wrapped or not with validation code at object creation time. This is highly efficient, as each time an entity is executed that is not being validated, the entity executes as is, without any determination made.

In the example function shown in FIG. 5, validation is on, and thus step 504 represents the validation code communicating with the document system to access the document file or files for this function to validate the input parameters, e.g., their types and/or values as described in some of the examples herein, as well as anything else desired. The association between the function and the document file is maintained in the document system, and it may be that the function derives from an object, in which event the document file for that object (and possibly the object from which it derives, and so on) also may need to be accessed for the corresponding validation functions (and/or statements). Note however that an alternative is to have the validation code that wraps the function be provided with this information at the time of object creation and wrapping, whereby the names or the like of the associated document or documents for this function are known in advance. It is also alternatively feasible to provide the validation wrapper, for each function to be validated, with the needed validation functions and/or statements so that when the function is wrapped, the validation code is built into the validation wrapper, in which event neither the document system nor the document or documents for this function need be accessed during runtime to perform validation.

In this example, consider that the document system locates the needed executable file(s) for the function, and those file(s) invoke the validation function and/or execute statements related to validation. The document system (or the executable file(s) accessed thereby) return True (or Pass) if validated, or False (or Fail) if not, which is evaluated by the wrapped validation code at step 506. An error is thrown at step 508 if failed, otherwise the function is executed at step 510. Note that it is alternatively feasible for the document system (or the executable file(s) accessed thereby to throw an error and halt program execution or otherwise invoke an error handler for validation errors.

After the function executes, the function result value or values are validated via step 512, along with anything else that needs post-execution validation. Step 514 evaluates whether the return from validation indicates that validation passed or failed, with the wrapper (or other validation-related entity) generating an error if failed at step 516. Otherwise validation passed, and the function returns the values to the invoking entity at step 518 and ends.

Figure 6:
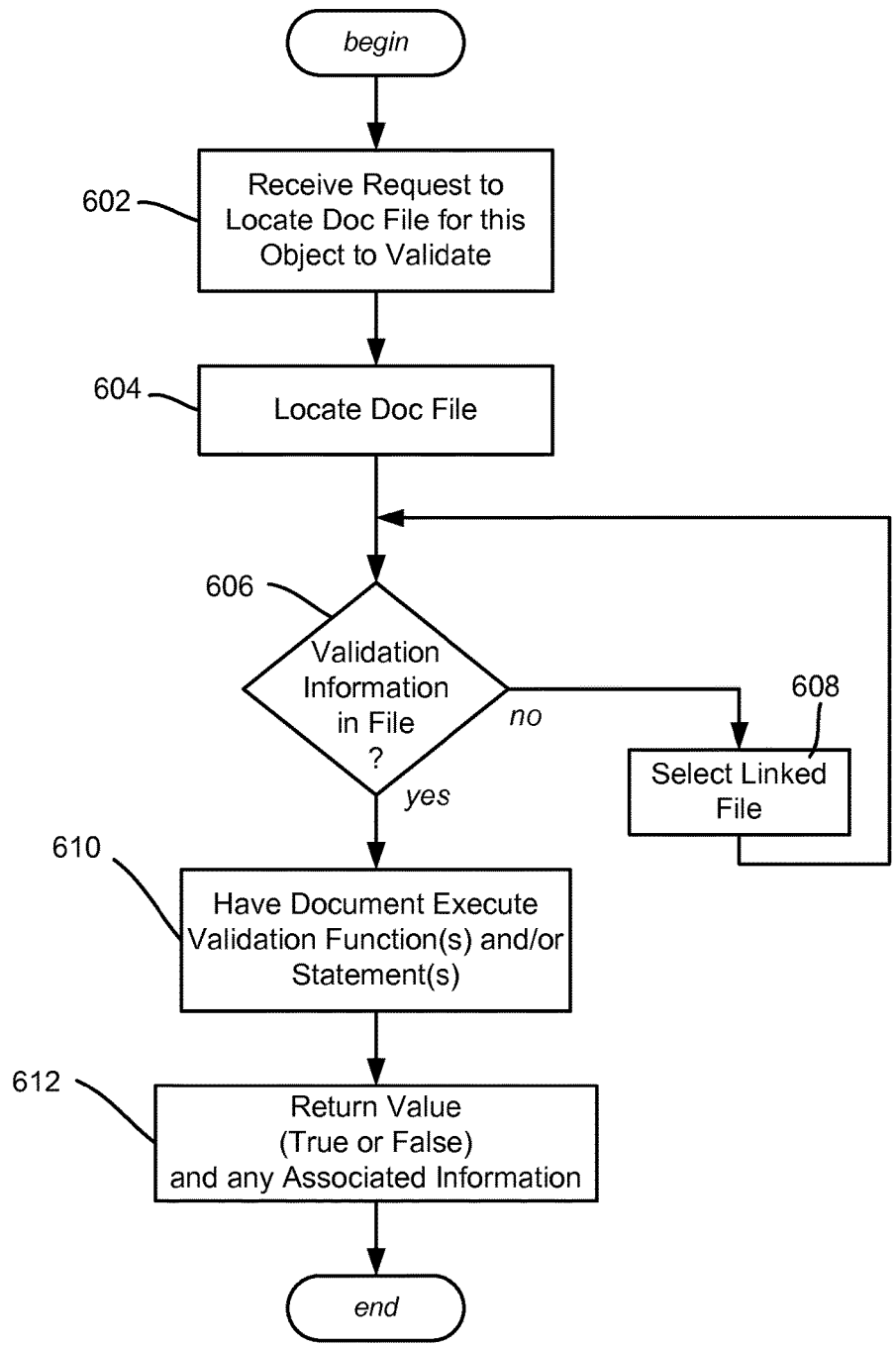
FIG. 6 is an example representation of a document system locating validation information for an object/part of an object, according to one or more example implementations.

As described herein, a document associated with an object may not contain the needed information to perform validation on its code (e.g., a function), because the validation information is in another document file, that is, one associated with an object from which the object derived. Thus, the document system is configured to locate the document file in which the validation function/other code is located. This is generally represented in FIG. 6, where the document system is invoked to locate (step 602) the document file for something to be validated, e.g., some part of the object such as a function or property that needs to be validated (e.g., the part is wrapped with validation code). Note that these example steps may be performed during runtime, or, for example when an object is created and wrapped for validation so as to couple the documents or the validation functions to the validation wrapper code in some way.

In any event, the document system looks for the validation information in the executable file corresponding to the object's process (step 604). For example, consider that the object needs a property type validated, in which the object is derived from a base class. The object may override the base class property value, but may not, or even if overridden may not have any validation information (e.g., a named validation function) associated with this property value in the object's executable file. If not found at step 606, at step 608 the document system moves to a next linked file (e.g., the executable file for the base class) and so on (e.g., the executable file for the interface) until the validation information is found. When found, whether for this object or registered on another object, this validation information (e.g., the document and its validation function) is used for validation at step 610, e.g., the document file executes the validation function and provides a result at step 612, including True or False in this example, possibly with associated information, which may be an error code, a textual description of the error, and so on. Note that in an implementation in which the document system couples the validation information to the object or its validation wrapper during creation time rather than locating it at runtime, step 610 instead uses the validation information to make the coupling rather than having the validation function or other code execute.

Turning to aspects related to generation of human readable documentation, consider the JSON object below:

```
// This function is a test function
(function ( ) {
    "use strict";
    define(["core/docs"],
    function (docs) {
        docs.registerDoc({
            namespace: "test",
            className: "testtype",
            baseClass: "test.basetype",
            description: "AAAA",
            constructors: [
                {
                    description: "BBBB",
                    params: [
                        {
                            name: "CCCC",
                            description: "DDDD",
                            validation: foo( )
                        }
                    ]
                }
            ],
            properties: [
                {
                    name: "EEEE",
                    description: "FFFF",
                    validation: foo2( )
                }
            ],
            events: [
                {
                    name: "GGGG",
```

-continued

```
                    description: "HHHH"
                }
            ],
            methods: [
                {
                    name: "IIII",
                    description: "JJJJ",
                    params: [
                        {
                            name: "KKKK",
                            description: "LLLL",
                            validation: f00321( )
                        }
                    ]
                }
            ]
        });
    });
```

The document system walks the JSON object and locates its name data, base class data, comments, constructor data, properties data, events data and methods data. Each of these may be written out to a temporary file in any suitable format, whereby a tool such as YUIdoc may process the temporary file into a human readable document.

Figure 7:
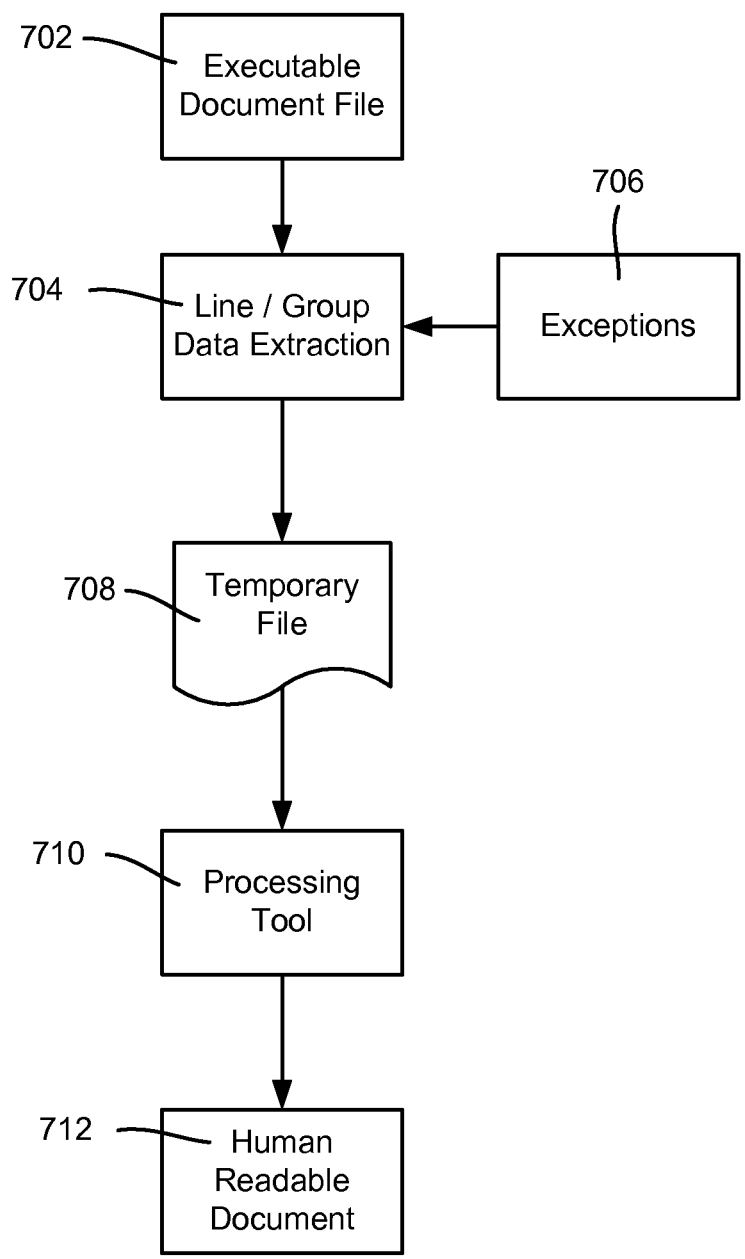
FIGS. 7-9 provide an example block diagram, flow diagram and representation, respectively, exemplifying the processing of a document file into more readable documentation, according to one or more example implementations.
Figure 8:
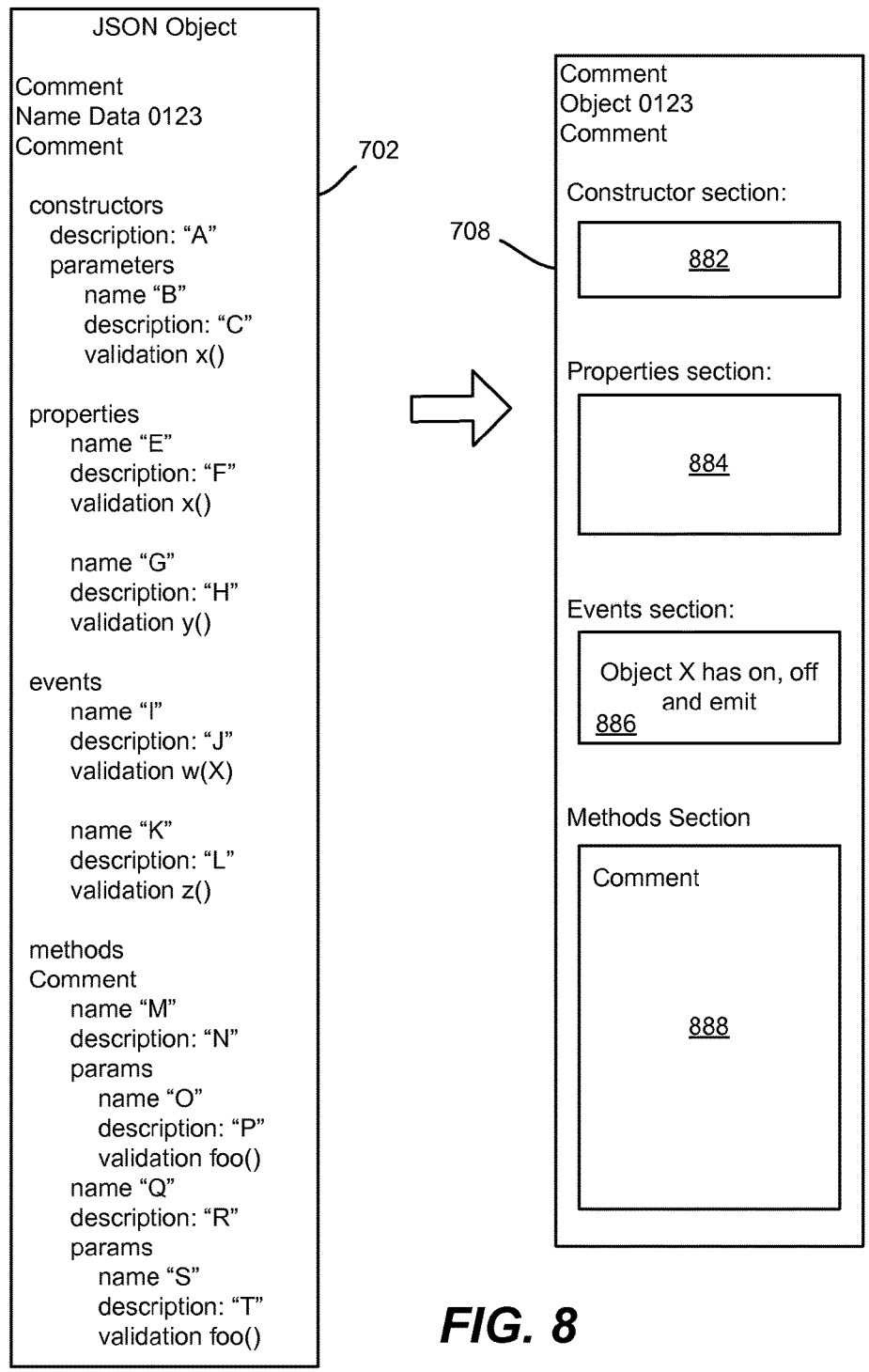
Figure 9:
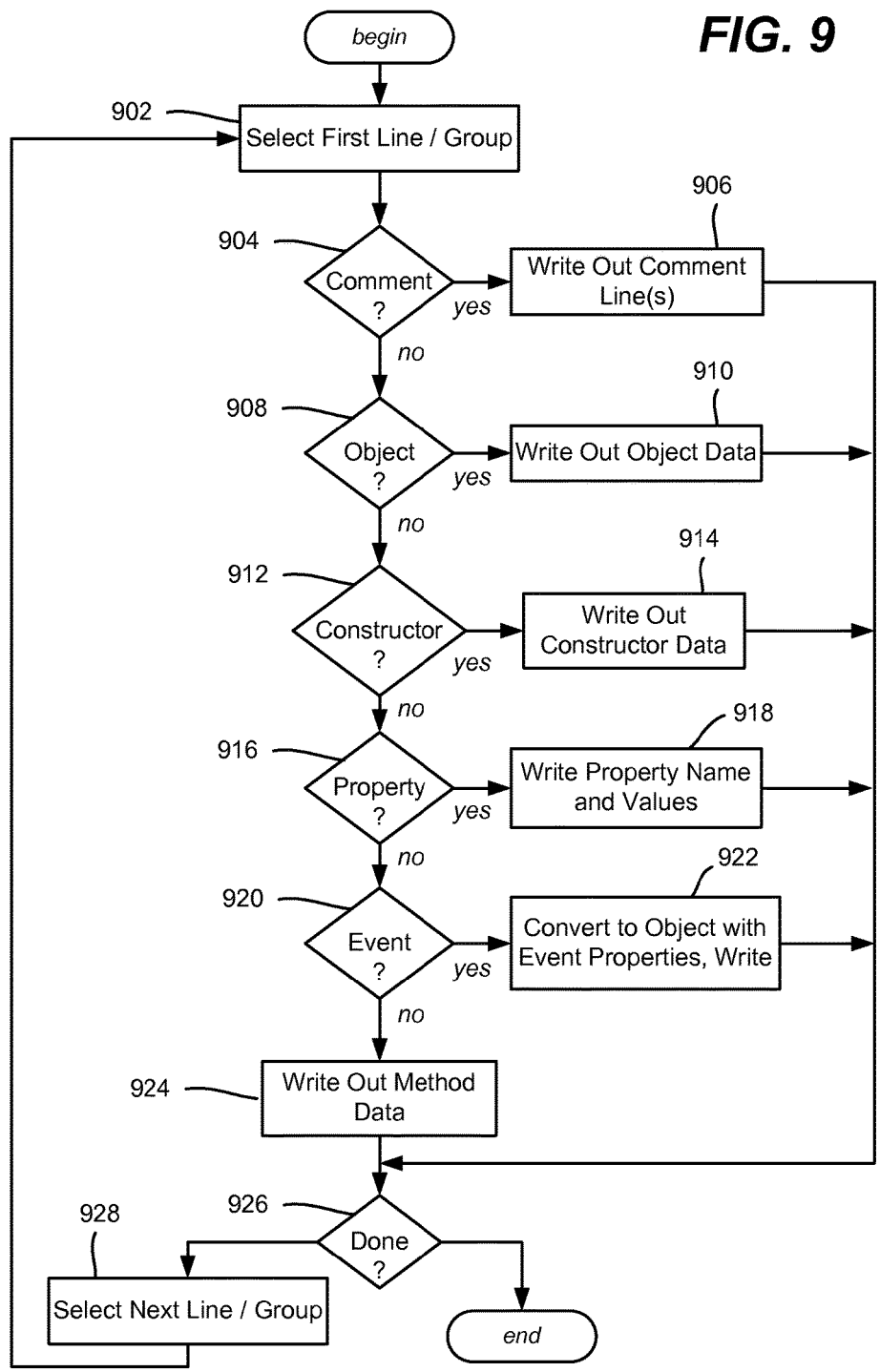

By way of example, FIGS. 7-9 show the general process for processing a document file 702 into a temporary (generally human-readable) file 708, which may then be used by a tool 710 to provide a more formal human-readable document. In general, the lines or groups of lines of a JSON object 702 are walked by a process 704 to extract relevant information. There may be exceptions 706, e.g., in the example of FIGS. 7-9 JSON along with OOP and the document system provides a rich document file format with complex types (e.g., AND, OR and so on) that may not be supported, whereby they can be modified based upon the exceptions 706 to something the tool 710 understands. Similarly, events, which are not necessarily conventional events in OOP and in the document system but rather correspond to a high level concept, may be converted to an object, having a simple on, off and emit function that is understood by the tool.

With respect to processing lines or groups of lines in the JSON object 702, step 902 selects the first line or group of lines. Steps 904 and 906 handle comments, steps 908 and 910 handle object data, e.g., name-related information, derivation information, and so on. These can be written out as straightforward text. Steps 912 and 914 handle constructor-related data, which may be written to its own section 882 (FIG. 8), as do steps 916 and 918 for writing property-related data to its own section 884.

As described above, events may be handled as an exception, e.g., via steps 920 and 922 as event object data to an events section 886. In this simplified example, there is nothing else possible other than methods, which are handled via step 924 writing out method-related data to a method section 888. Note that a comment appears within the method section because there was a comment in the JSON object. As can be readily appreciated, there may be many other entities within an object, e.g., collections, enumerations and so forth that may be handled in a similar manner.

As can be seen, the technology described herein performs runtime validation for selected objects, functions, properties, constructors events and so forth via a document for each object. The document also may be used to produce more readable documentation. The separate documents facilitate more readable code, more readable documentation and the runtime validation of code.

One or more aspects are directed towards accessing validation information maintained in a document associated with an object, and using the validation information during runtime to run validation code to determine whether part of the object or data associated with part of the object passes validation or fails validation. Described herein is running code of the object if the validation code determines that the part of the object or data associated with the part of the object passes validation, or outputting an error if the validation code determines that the part of the object or data associated with the object fails validation.

Accessing the validation information maintained in the document associated with an object may include locating another document linked to the document and finding the validation information therein. Accessing the validation information maintained in the document associated with the object may include locating a validation function; using the validation information during runtime to run the validation code may include invoking the validation function. Accessing the validation information maintained in the document associated with an object may include locating a plurality of validation functions; using the validation information to run the validation code may include invoking each of the plurality of validation functions and combining a result of each of the plurality of validation functions to determine whether the part of the object or data associated with the part of the object passes validation or fails validation.

When creating the object, the code of the object may be wrapped with a validation wrapper. The document file may be processed into human readable documentation.

The part of the object may be a function, and using the validation information during runtime to run the validation code may include running pre-validation code to determine whether the data associated with the function passes validation or fails validation before the running the function; if the pre-validation code determines that the data associated with part of the object passes validation, the function may be run. Post-validation code may be run to determine whether a result of the function passes validation or fails validation, with the result returned if the post-validation code determines that the a result of the function passes validation, or an error output if the post-validation code determines that the a result of the function fails validation.

The part of the object may be a function and the data associated with the function may be an input parameter value. Using the validation information during runtime to run validation code to determine whether the data associated with the function passes validation or fails validation may include evaluating a type of the input parameter value or a value of the input parameter value, or both. When the validation code determines that the data associated with the function passes validation, after running the function, described herein is validating a type of a result of the function and/or a value of a result of the function.

The part of the object may be a property, a constructor or an event; using the validation information during runtime to run validation code may include evaluating a type and/or a value of the data associated with the part of the object.

One or more aspects are directed towards an object and a document file associated with the object, the document file containing validation information indicating that a part of the object is to be validated. Validation code that corresponds to the validation information is executed during runtime to validate the part of the object. The object may be a JavaScript® object and the document file may be a JSON object.

The part of the object to be validated may be a function, an event, a property, or a constructor. The validation information may identify a validation function to be invoked during runtime. If the part of the object to be validated is a function, the validation information may identify a pre-validation function to be invoked during runtime before the function is run, and a post-validation function to be invoked during runtime after the function is run.

One or more aspects are directed towards locating pre-validation code and post-validation code associated with a function, and running the pre-validation code to determine whether to run the function. If running the pre-validation code determines that the function is not to run, an error is output. If running the pre-validation code determines that the function is to run, described herein is running the function and running post-validation code to determine whether to return a result of the function. If running the post-validation code determines that the result of the function is not to be returned, an error is output. If running the post-validation code determines that the result of the function is to be returned, the result of the function is returned.

Running the pre-validation code may include evaluating an input parameter value with respect to a type of the input parameter value and/or a data value of the input parameter value. Running the post-validation code may include evaluating a result value with respect to a type of the result value and/or a data value of the result value, or both the type of the result value and a data value of result value. Running the pre-validation code may include running a first validation function, and wherein running the post-validation code may include running a second validation function.

Example Computing Device

The techniques described herein can be applied to any device or set of devices (machines) capable of running programs and processes. It can be understood, therefore, that personal computers, laptops, handheld, portable and other computing devices and computing objects of all kinds including cell phones, tablet/slate computers, gaming/entertainment consoles and the like are contemplated for use in connection with various implementations including those exemplified herein. Accordingly, the general purpose computing mechanism described below in FIG. 10 is but one example of a computing device.

Implementations can partly be implemented via an operating system, for use by a developer of services for a device or object, and/or included within application software that operates to perform one or more functional aspects of the various implementations described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is considered limiting.

Figure 10:
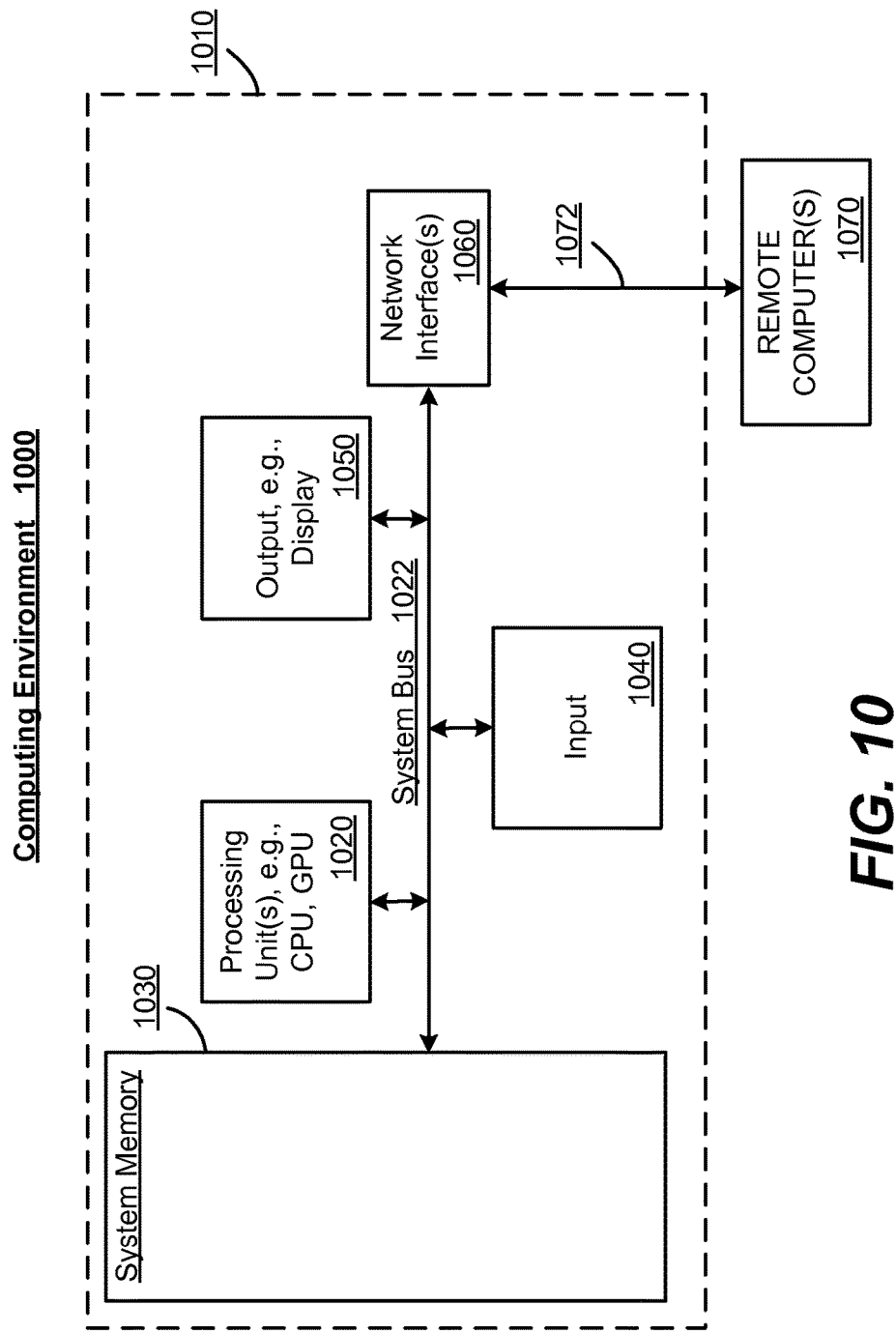
FIG. 10 is a block diagram representing an example computing environment into which aspects of the subject matter described herein may be incorporated.

FIG. 10 thus illustrates an example of a suitable computing system environment 1000 in which one or aspects of the implementations described herein can be implemented, although as made clear above, the computing system environment 1000 is only one example of a suitable computing environment and is not intended to suggest any limitation as to scope of use or functionality. In addition, the computing system environment 1000 is not intended to be interpreted as having any dependency relating to any one or combination of components illustrated in the example computing system environment 1000.

With reference to FIG. 10, an example device for implementing one or more implementations includes a general purpose computing device in the form of a computer 1010. Components of computer 1010 may include, but are not limited to, a processing unit 1020, a system memory 1030, and a system bus 1022 that couples various system components including the system memory to the processing unit 1020.

Computer 1010 typically includes a variety of machine (e.g., computer) readable media and can be any available media that can be accessed by a machine such as the computer 1010. The system memory 1030 may include computer storage media in the form of volatile and/or nonvolatile memory such as read only memory (ROM) and/or random access memory (RAM), and hard drive media, optical storage media, flash media, and so forth; as used herein, machine readable/computer readable storage media stores data that does not include transitory signals, (although other types of machine readable/computer readable media that is not storage media may). By way of example, and not limitation, system memory 1030 may also include an operating system, application programs, other program modules, and program data.

A user can enter commands and information into the computer 1010 through one or more input devices 1040. A monitor or other type of display device is also connected to the system bus 1022 via an interface, such as output interface 1050. In addition to a monitor, computers can also include other peripheral output devices such as speakers and a printer, which may be connected through output interface 1050.

The computer 1010 may operate in a networked or distributed environment using logical connections to one or more other remote computers, such as remote computer 1070. The remote computer 1070 may be a personal computer, a server, a router, a network PC, a peer device or other common network node, or any other remote media consumption or transmission device, and may include any or all of the elements described above relative to the computer 1010. The logical connections depicted in FIG. 10 include a network 1072, such as a local area network (LAN) or a wide area network (WAN), but may also include other networks/buses. Such networking environments are commonplace in homes, offices, enterprise-wide computer networks, intranets and the Internet.

As mentioned above, while example implementations have been described in connection with various computing devices and network architectures, the underlying concepts may be applied to any network system and any computing device or system in which it is desirable to implement such technology.

Also, there are multiple ways to implement the same or similar functionality, e.g., an appropriate API, tool kit, driver code, operating system, control, standalone or downloadable software object, etc., which enables applications and services to take advantage of the techniques provided herein. Thus, implementations herein are contemplated from the standpoint of an API (or other software object), as well as from a software or hardware object that implements one or more implementations as described herein. Thus, various implementations described herein can have aspects that are wholly in hardware, partly in hardware and partly in software, as well as wholly in software.

The word "example" is used herein to mean serving as an example, instance, or illustration. For the avoidance of doubt, the subject matter disclosed herein is not limited by such examples. In addition, any aspect or design described herein as "example" is not necessarily to be construed as preferred or advantageous over other aspects or designs, nor is it meant to preclude equivalent example structures and techniques known to those of ordinary skill in the art. Furthermore, to the extent that the terms "includes," "has," "contains," and other similar words are used, for the avoidance of doubt, such terms are intended to be inclusive in a manner similar to the term "comprising" as an open transition word without precluding any additional or other elements when employed in a claim.

As mentioned, the various techniques described herein may be implemented in connection with hardware or software or, where appropriate, with a combination of both. As used herein, the terms "component," "module," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it can be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the example systems described herein, methodologies that may be implemented in accordance with the described subject matter can also be appreciated with reference to the flowcharts/flow diagrams of the various figures. While for purposes of simplicity of explanation, the methodologies are shown and described as a series of blocks, it is to be understood and appreciated that the various implementations are not limited by the order of the blocks, as some blocks may occur in different orders and/or concurrently with other blocks from what is depicted and described herein. Where non-sequential, or branched, flow is illustrated via flowcharts/flow diagrams, it can be appreciated that various other branches, flow paths, and orders of the blocks, may be implemented which achieve the same or a similar result. Moreover, some illustrated blocks are optional in implementing the methodologies described herein.

CONCLUSION

While the invention is susceptible to various modifications and alternative constructions, certain illustrated implementations thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the invention is not to be limited to any single implementation, but rather is to be construed in breadth, spirit and scope in accordance with the appended claims.

What is claimed is:

1. A method, comprising:
accessing, by a system including a processor, a repository comprising respective documents separate from and associated with objects, wherein the documents comprise respective validation information associated with the objects, there is a one-to-one relationship between the documents and the objects, and the respective validation information comprises source code for validating the associated objects;
obtaining, by the system, validation information maintained in a document of the documents associated with an object of the objects;
executing, by the system during runtime, validation code using the validation information to determine whether part of the object or data associated with the part of the object passes validation or fails the validation, wherein the executing the validation code comprises, in response to identifying an inheritance relationship between the object and another object, accessing, by the system, other validation information maintained in an additional document of the documents separate from and associated with the other object; and
running, by the system, code of the object in response to a first determination by the validation code that the part of the object or the data associated with the part of the object passes the validation, or outputting, by the system, an error in response to a second determination by the validation code that the part of the object or the data associated with the part of the object fails the validation.

2. The method of claim 1, further comprising locating the additional document separate from and associated with the other object.

3. The method of claim 1, wherein obtaining the validation information comprises locating a validation function in the source code, and wherein the running the validation code comprises invoking the validation function.

4. The method of claim 1, wherein obtaining the validation information comprises locating a plurality of validation functions in the source code, and wherein the running the validation code comprises invoking each of the plurality of validation functions and combining a result of each of the plurality of validation functions to determine whether the part of the object or data associated with the part of the object passes the validation or fails the validation.

5. The method of claim 1, wherein the validation information specifies a threshold amount of time for the object to complete execution.

6. The method of claim 1, wherein the part of the object comprises a function, and wherein using the validation information during runtime to run the validation code comprises running pre-validation code to determine whether the data associated with the function passes the validation or fails the validation before the running the function, and if the pre-validation code determines that the data associated with part of the object passes the validation, running the function.

7. The method of claim 6, further comprising running, by the system, post-validation code to determine whether a result of the function passes another validation or fails the other validation, and returning the result if the post-validation code determines that a result of the function passes the other validation, or outputting an error if the post-validation code determines that the result of the function fails the other validation.

8. The method of claim 1, wherein the part of the object comprises a function and wherein the data associated with the function comprises an input parameter value, and wherein the running the validation code comprises evaluating at least one of a type of the input parameter value or a value of the input parameter value.

9. The method of claim 8, wherein the validation code determines that the data associated with the function passes validation, and further comprising, after running the function, validating at least one of a type of a result of the function or a value of a result of the function.

10. The method of claim 1, wherein the executing the validation code comprises, in response to determining that validation information does not comprise first validation information associated with a portion of the object, iteratively examining the respective documents associated with linked objects of the objects in a chain of linked objects from the object until the first validation information is located in one of the respective documents associated with linked objects, and employing the first validation information in executing the validation code on the object.

11. The method of claim 1, further comprising employing the other validation information maintained in the additional document separate from and associated with the other object to determine whether the part of the object or the data associated with the part of the object passes validation or fails the validation.

12. A system comprising:
a processor; and
a memory communicatively coupled to the processor, the memory having stored therein computer-executable instructions, comprising:
a repository comprising respective document files separate from and associated with objects, wherein the document files comprise respective validation information associated with the objects, there is a one-to-one relationship between the document files and the objects, and the respective validation information comprises source code for validating the associated objects;
validation code configured to, during runtime validate at least part of an object of the objects based upon validation information contained within a document file of the document files associated with the object, comprising, in response to identification of an inheritance relationship between the object and another object, access other validation information maintained in an additional document of the documents separate from and associated with the other object.

13. The system of claim 12, wherein the at least the part of the object at least one of a function, an event, a property, or a constructor.

14. The system of claim 12, wherein the validation information identifies a validation function in the source code to be invoked during runtime.

15. The system of claim 12, wherein the at least the part of the object a function, and wherein the validation information identifies a pre-validation function in the source code to be invoked during runtime before the function is run, and a post-validation function in the source code to be invoked during runtime after the function is run.

16. The system of claim 12, wherein the object comprises a JavaScript® object and wherein the document file comprises a JavaScript® Object Notation (JSON) object.

17. A non-transitory computer-readable medium having instructions stored thereon that, in response to execution, cause a system including a processor to perform operations comprising:
   accessing a repository comprising respective documents separate from and associated with objects, wherein the documents comprise respective validation information associated with the objects, there is a one-to-one relationship between the documents and the objects, and the respective validation information comprises source code for validating the associated objects;
   obtaining validation information maintained in a document of the documents associated with an object of the objects;
   running, during runtime, pre-validation code in the source code using the validation information to determine whether part of the object or data associated with the part of the object passes validation or fails the validation, wherein executing the pre-validation code comprises, in response to identifying an inheritance relationship between the object and another object, accessing, by the system, other validation information maintained in an additional document of the documents separate from and associated with the other object; and
   running code of the object in response to a first determination by the pre-validation code that the part of the object or the data associated with the part of the object passes the validation, or outputting, by the system, an error in response to a second determination by the pre-validation code that the part of the object or the data associated with the part of the object fails the validation.

18. The non-transitory computer-readable medium of claim 17, wherein the running the pre-validation code comprises evaluating an input parameter value with respect to at least one of a type of the input parameter value or a data value of the input parameter value.

19. The non-transitory computer-readable medium of claim 17, the operations further comprising running post-validation code comprising evaluating a result value with respect to at least one of a type of the result value or a data value of the result value.

20. The non-transitory computer-readable medium of claim 19, wherein the running the pre-validation code comprises running a first validation function, and wherein the running the post-validation code comprises running a second validation function.

* * * * *